May 2, 1950     R. MIOLLIS     2,505,984
CHEESE MAKING METHOD
Filed Sept. 6, 1946
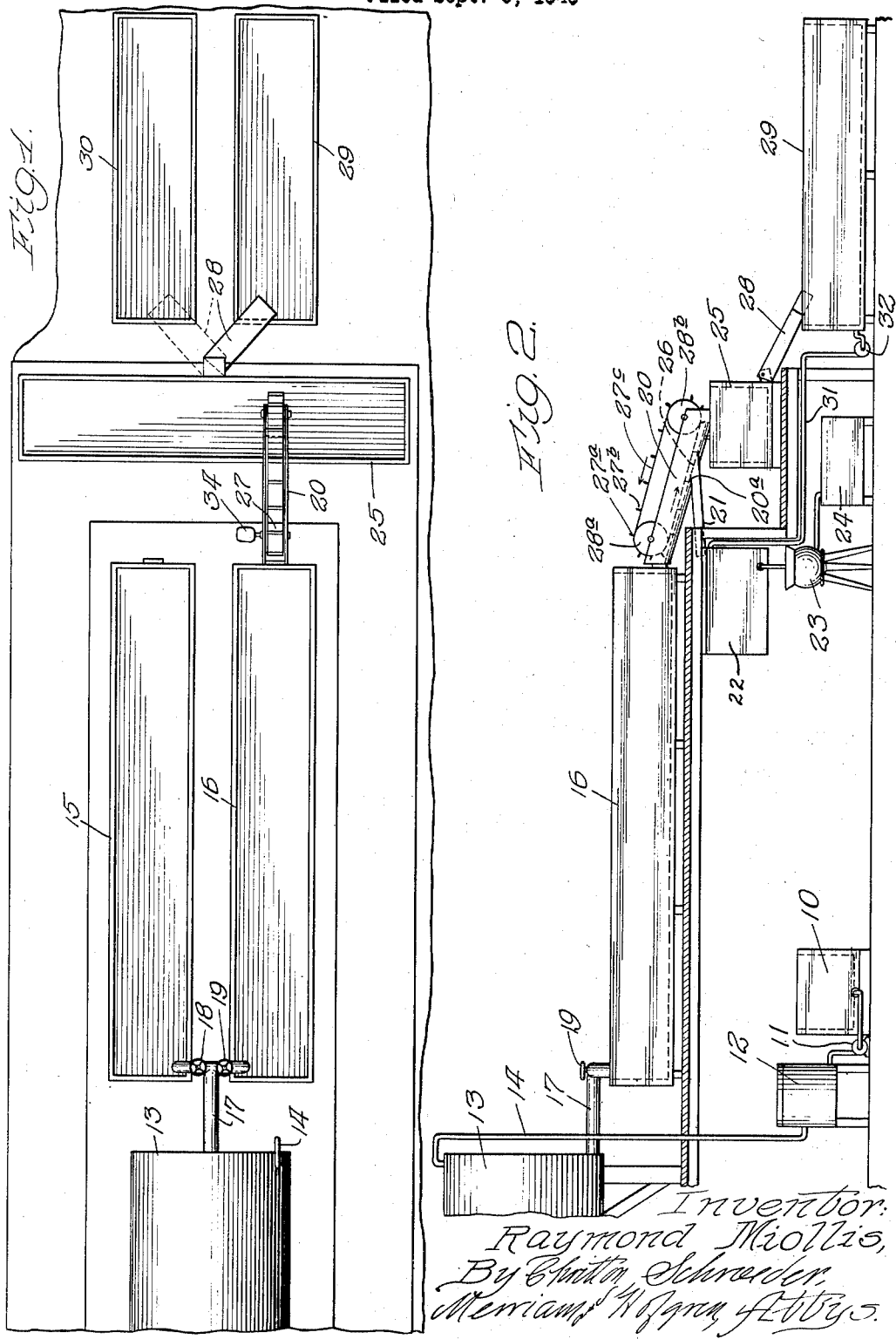

Patented May 2, 1950

2,505,984

UNITED STATES PATENT OFFICE 2,505,984

CHEESE-MAKING METHOD

Raymond Miollis, Maywood, Ill.

Application September 6, 1946, Serial No. 695,174

6 Claims. (Cl. 99—116)

This invention relates to cheese making method and apparatus, and more particularly to means for increasing the output of a cheese plant and to rendering the cheese making processes more nearly continuous.

Except for processes making use of certain methods and apparatus heretofore devised by me, as will be more fully pointed out hereafter, cheese heretofore has been and continues to be made in batches in a single vat. Cheese of the semi-soft and hard type, to which this invention is directed, has heretofore been made by a process involving coagulation of the milk in a cheese vat, repeated stirring and drainage in the same vat, and finally knitting or matting of the curd, still in the same vat.

I have heretofore taught the cheese art to expedite and improve this age old process by matting the cheese curd and doing the final drainage therefrom in a different vat from the cheese vat, one which I term a molding patent. My present method and apparatus constitutes a still further improvement and brings cheese making still nearer to a continuous process.

My present improvement comprises, as its principal feature, the use of a treatment vat intermediate the cheese vat and molding vat of my earlier cheese making processes. This results in the cheese vat being tied up substantially only for the time required for coagulation of the milk and first drainage of the whey for each batch; and thereafter the curd is transferred to the treatment vat for washing and further drainage, and eventually to the molding vat where the curds mat together. This results in the cheese vat being freed of its contents quite early in the process of making a given batch of cheese, enabling a new batch of milk to be put in the cheese vat and coagulation started while the previous batch is still undergoing further treatment in the treatment vat. In employing the improved process here being disclosed and claimed it is preferable to employ two cheese vats and two molding vats with a single treatment vat therebetween. With such an arrangement the contents of the cheese vats are transferred alternately to the treatment vat, and the contents of this vat are transferred alternately to the molding vats, as the time required for each batch in the cheese vat and in the molding vat is longer than the time involved in washing and draining in the treatment vat.

By use of this preferred arrangement of mine, and with cheese vats having a capacity of 11,000 pounds of milk each, a size which is approximately that now used conventionally in the making of cheese from pasteurized milk, and by staggering or altering the admission of milk to the cheese vats, 22,000 pounds of milk per hour can be processed. This is about the maximum amount that can be handled in the milk receiving room of the ordinary plant and pasteurized in the largest sized pasteurizers available today. It will be understood, however, that if the intake and pasteurizing capacities permit my arrangement shown and hereafter described in detail can be duplicated, or three cheese vats and three molding vats used with intermediate treatment vat means, to process still larger quantities of milk per hour into cheese.

One feature of this invention is that it provides an improved cheese making process more nearly approaching a continuous operation; another feature of this invention is that it greatly increases the amount of cheese which can be made in a given cheese vat capacity by eliminating therefrom all drainage and washing steps after the first whey drainage, comprising a considerable saving in time since the second whey drainage operation is by far the longest; still another feature of this invention is that it minimizes difficulties in whey drainage and cheese spoilage heretofore sometimes resulting from contamination in the second whey drainage operation, improper handling at this stage being very easy under previous methods and having a harmful effect on the cheese eventually resulting from the batch; yet another feature of this invention is that it reduces the loss of yield due to rough and improper handling of the curd, and renders the entire process more sanitary by eliminating the need for curd separation by hand; a further feature of this invention is that it eliminates or greatly reduces the time heretofore wasted in breaking up lumps of curd, in "trenching" the curd, and the like; and yet a further invention is that it removes the curd from the cheese vat so promptly that it can be used many more times per day. Other features and advantages of this invention will be apparent from the following specification and claims in which:

Figure 1 is a plan view of a part of a cheese plant embodying my inventions; and Figure 2 is a side elevational view, partly in section, of the part of the plant shown in Figure 1.

The cheese making method and apparatus here being disclosed and claimed is particularly designed for making, from pasteurized milk, natural cheese which may be sold to the consumer in large or so-called "jumbo" sizes or in relatively small packages, usually less than five pounds.

Natural cheese, of course, is to be distinguished from so-called "processed cheese." In the process with which I am here concerned large batches of milk, as 10,000 or 11,000 pounds at a time, are coagulated, the curd treated, as by repeated stirring and draining, the curd knitted or matted, and the resultant cheese mass formed into large sized blocks or cylinders, pressed and cured in such blocks, and finally cut up into small loaves or pieces normally between a half pound and several pounds each. While a number of patents on such a process and the apparatus used therein have heretofore been issued to me, reference may be made to my Patent No. 2,103,545 of December 28, 1937, for a description of a representative complete process and apparatus of the type with respect to which the present invention here being disclosed constitutes an improvement. Since reference may be made to such patent, or other of my earlier patents, to supplement the present disclosure, only a very brief description of the complete process will be given here, and then this specification will be limited to the portions of a cheese plant particularly associated with the method and apparatus comprising my improvement.

In a plant of the character with which I am concerned milk is received from tank trucks, cans or otherwise in a receiving room, any desired weighing, sampling and the like being done in such room in conventional manner. The milk is then pasteurized and that to be used for any particular batch delivered to a cheese vat. Certain additives are then put into the milk and the mass set and worked until cheese curd of the desired type is formed. Heretofore at least two and sometimes more drainage operations were performed in the cheese vat; but in my present process only the first drainage operation is performed in the cheese vat and the curd is then transferred to a treatment vat which has preferably been filled with brine, wash water, whey, or other bath liquid. I preferably effect some further drainage of the curd during transfer from the cheese vat to the treatment vat, as will be more fully described hereafter. Further stirring and drainage is effected in the treatment vat and the curd finally transferred to a molding vat where additional drainage takes place (and where some initial pressing may be done) and where the cheese curds are caused to mat or knit together fairly well. If pressing and curing is to be done in large rectangular blocks the partially knit cheese in the molding vat is cut into blocks of the desired size and shape, these blocks usually extending the full width of the molding vat. These blocks are then pressed in any desired manner, as for example as described in my above patent or in my copending application Serial No. 652,577, filed November 9, 1944. After the present operation is completed the blocks are cured in a location of the proper humidity and temperature, generally a cellar, with such brushing, turning and the like as may be necessary, for a period which is usually thirty days or more. The cured block is then cut into loaves or pieces of the desired size and wrapped and waxed or otherwise packaged for shipment.

Referring now more especially to the particular embodiment of my invention illustrated in the accompanying drawings, which embodiment will be understood to constitute only one of many ways in which my inventions hereafter claimed may be embodied, milk brought into the receiving room is poured into a receiving vat 10 from which it is forced, by a pump 11, through a pasteurizer 12 and up to temporary storage tank 13, as through a pipe here identified as 14. While transfer of the milk and then of the cheese curds from one location to another may thereafter be by pumps or other such power operated means, I prefer to effect as many of such transfers as possible by gravity and accordingly I prefer to arrange the tank 13 at a substantial elevation above that of the molding vats eventually reached by the curd, as for example 12 to 15 feet thereabove.

At a level only a few feet lower than that of the bottom of the tank 13 I provide two cheese vats here identified as 15 and 16, the arrangement being such that milk may flow by gravity from the tank 13 into either of the cheese vats through the pipe 17 as determined by operation of valves 18 and 19. For purposes of this description we may assume that the cheese vat 16 is the first to be filled in the morning, either by milk just received and pasteurized or milk carried overnight in the tank 13. As has been mentioned heretofore, the cheese vat 16 may be of a size adapted to receive about 11,000 pounds of milk. The rennet, cheese culture, and any other desired additives are then put in the milk and the mass allowed to coagulate, which may take in the neighborhood of 30 to 45 minutes. The curd is then cut and stirred for a few minutes and the first whey drawn off, the first drainage operation usually not lasting more than about five minutes. In the particular embodiment illustrated in the drawing this drainage is effected by opening a gate at the right hand end of the vat, with a screen in place to prevent any curd leaving the vat (the gate and screen not being illustrated in detail since they are conventional), the whey then flowing down a chute 20 forming part of transfer apparatus to be hereafter described, and back down another chute 21 into the whey receiving tank 22, where it may be temporarily held or where it may be passed immediately to the separator 23 from whence the skimmed whey is delivered to the skimmed whey tank 24, the butter fat therein having been separated therefrom.

After this first drainage the curd is stirred slightly, generally for five minutes or more, to break up any lumps which may have started to form and eliminate more moisture from the curd, and the curd then is transferred to the intermediate or treatment vat 25. While any suitable method of effecting such transfer may be employed, I prefer to use means assisting movement of the curd while at the same time permitting further drainage therefrom, one such means being illustrated in the drawings. In the particular transfer means which I have illustrated as representative the bottom and sides of the trough 20 are of suitable sheet metal, as stainless steel, imperforate except for the opening 20a communicating with the trough 21. A false bottom of perforated sheet metal, here identified as 26, lies near the bottom of the trough but preferably slightly spaced therefrom, as about an inch, to permit flow of whey therebeneath. Curd leaving the trough 16 is assisted in its movement down the false bottom of the transfer apparatus by means here shown as paddles 27a, 27b, etc., on an endless belt 27 passing over drums 28a and 28b at the ends of the trough, the belt being moved by any suitable power source, as the electric motor 34. Whey draining off from the curd during this transfer operation also passes through the chute 21 to the whey receiving tank 22.

During the time that the milk is coagulating and the curd receiving its first drainage in the cheese vat 16 the intermediate or treatment vat 25 is preferably filled with the bath or wash water, as warm brine, so that curd leaving the transfer device moves directly into this bath in the treatment tank. Having the bath already in the intermediate vat saves the time otherwise needed to pour bath liquid into a vat containing the cheese, which may run from five minutes in a specially equipped factory to fifteen minutes where an ordinary hose is used. Moreover, not only is the time required for second drainage no longer time during which the cheese vat is tied up, but also this vat is released without the necessity of using time heretofore usually necessary to break up mattings in the curd after the second drainage, usually about ten minutes; and by obviating the matting in the cheese vat and by dumping the loose curd directly into its bath I avoid unnecessary formation of curd dust, undesirable small pieces of curd resulting from the breaking up of mattings. While the transfer time cuts down the saving of time by a small amount, this is usually a relatively small proportion of the time saved; and my process results in a more sanitary operation in that breaking up of mattings in the cheese vat (which must usually be done by hand) is avoided entirely.

Further stirring of the curd is effected in the treatment vat 25, preferably by mechanical agitators of the same type as are conventionally used in cheese vats, and when the curd is ready for its next drainage this is effected by opening the gate in the intermediate vat, in the particular embodiment illustrated the whey then running through the trough 28 to the molding vat 29, for example, from whence it may be forced through the pipe 31 to the whey vat 22 by the pump 32. If desired, a plug (not illustrated) may be removed from the intermediate vat 25 to permit a more direct return of the whey being drained, avoiding its passage through the molding vat 29. The molding vat 29 may be one of a pair also including the molding vat 30, the function and construction of such a vat being more fully described in my earlier mentioned patent or in my Reissue Patent 21,834 of June 17, 1941, for example, more particularly concerned with the molding of the curds. After the second or any further necessary drainage is effected in the treatment tank, the curd therein is transferred to a molding vat, as the vat 29, this being illustrated as accomplished by gravity through the chute 28, the molding vats being located at a level such that their top surfaces are below the bottom of the intermediate vat 25, the top surface of this vat being in turn below that of the bottoms of the cheese vats in the particular arrangement illustrated in the drawings.

While the three step process described is desirable even if only one cheese vat and one molding vat is employed, I prefer to have a plurality of cheese vats and a plurality of molding vats, as the pair of molding vats and the pair of cheese vats illustrated. With this arrangement the cheese vats alternately deliver curd which has undergone its first drainage to the treatment vat; and the treatment vat delivers curd which has undergone its second and possibly even a third drainage operation, and a washing operation, alternately to first one and then the other of the molding vats. Curd may be delivered from the cheese vat 15 to the intermediate or treatment vat 25 by moving thereto the transfer arrangement shown in the drawings as associated with the vat 16, or by using a second such transfer arrangement; and curd may be delivered from the treatment vat 25 to the molding vat 30 by moving the chute 28 to the position illustrated in dotted lines, for example. A very satisfactory schedule of operation with equipment of the kind here disclosed and employing my novel process involves delivery of 11,000 pounds of milk to the vat 16 every hour on the hour, for example; and an equal quantity of milk to the vat 15 every hour, but on the half hour. Coagulation, first drainage, and transfer from one of the cheese vats usually does not involve over fifty minutes, leaving ten minutes to wash out this vat and sterilize it, as by scalding water, before admission of the next batch of milk. With this schedule of operation a batch of curd is transferred to the treatment vat 25 every half hour, a half hour being ample to enable preparation of the bath, the second drainage operation, transfer of the cheese from the treatment vat to a molding vat, and washing and sterilizing of the treatment vat where needed. Because of the alternate delivery from the treatment vat, a molding vat only receives cheese once each hour, providing sufficient time for the matting, cutting and removal of the cheese. The result is a very efficient operation increasing the cheese output from a given capacity of cheese and molding vats by at least fifty per cent, minimizing certain factors which sometimes result in the production of undesirable cheese, and with much greater ease, cleanliness, and reduction in the number of skilled workmen needed. With the processes and apparatus here disclosed one skilled cheese maker can supervise a production of cheese at the rate of 22,000 pounds of milk per hour (a rate which heretofore required the use of at least two and preferably three skilled cheese makers), with common labor helping in the movement of the troughs, the sterilizing of the vats, and the like.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A method of making cheese, comprising: coagulating milk in a first vat into individual curds; making the first drawing of whey therefrom in said vat; transferring the individual curds to a second vat while draining at least some whey therefrom during said transfer; making a second drawing of whey from said curds in said second vat; and transferring the individual unmatted curds to a third vat and matting them therein.

2. A method of making cheese, comprising: coagulating milk in a first vat into individual curds; making the first drawing of whey therefrom in said vat; preparing a bath in a second vat; transferring the individual curds to said second vat; making a second drawing of whey from said curds in said second vat; and transferring the individual unmatted curds to a third vat and matting them therein.

3. A method of making cheese, comprising: coagulating milk in a first vat into individual curds; making the first drawing of whey therefrom in said vat; preparing a brine bath in a second vat; transferring the individual curds to said second vat while draining at least some whey therefrom during said transfer; making a second drawing of whey from said curds in said second vat; and transferring the individual unmatted curds to a third vat and matting them therein.

4. A method of making cheese, comprising: coagulating milk in a first cheese vat into individual curds; subsequently coagulating milk in a second cheese vat into individual curds; making a drawing of whey from the curds in said first cheese vat and transferring these first individual curds to a treatment vat before the coagulation is complete in said second cheese vat; making a second drawing of whey from said first curds in the treatment vat; transferring the first individual unmatted curds in the treatment vat to a first molding vat and matting them therein; making a drawing of whey from the curds in said second cheese vat and transferring these second individual curds to the treatment vat after the first curds have been transferred therefrom; making a second drawing of whey from said second individual unmatted curds in the treatment vat; and transferring the second curds in the treatment vat to a second molding vat and matting them therein.

5. A method of making cheese, comprising: coagulating milk in a first cheese vat into individual curds; subsequently coagulating milk in a second cheese vat into individual curds; preparing a bath in a treatment vat; making a drawing of whey from the curds in said first cheese vat and transferring these first individual curds to the treatment vat, while draining at least some whey therefrom during said transfer, before the coagulation is complete in said second cheese vat; making a second drawing of whey from said first curds in the treatment vat; transferring the first individual unmatted curds in the treatment vat to a first molding vat and matting them therein; preparing a second bath in a treatment vat; making a drawing of whey from the curds in said second cheese vat and transferring these individual curds to the second bath in the treatment vat, while draining at least some whey therefrom during said transfer; making a second drawing of whey from said second curds in the treatment vat; and transferring the second individual unmatted curds in the treatment vat to a second molding vat and matting them therein.

6. A method of making cheese, comprising: coagulating milk in a first cheese vat into individual curds; subsequently coagulating milk in a second cheese vat into individual curds; preparing a bath in a treatment vat; making a drawing of whey from the curds in said first cheese vat and transferring these first individual curds to the treatment vat, while draining at least some whey therefrom during said transfer, before the coagulation is complete in said second cheese vat; making a second drawing of whey from said first curds in the treatment vat; transferring the first individual unmatted curds in the treatment vat to a first molding vat and matting them therein; preparing a second bath in a treatment vat; making a drawing of whey from the curds in said second cheese vat and transferring these individual curds to the second bath in the treatment vat, while draining at least some whey therefrom during said transfer; making a second drawing of whey from said second curds in the treatment vat; transferring the second individual unmatted curds in the treatment vat to a second molding vat and matting them therein; and repeating these steps alternately using the first cheese vat and the first molding vat in one case and the second cheese vat and second molding vat in the other, removing the matted curd from a molding vat in each case before another mass of curd is delivered thereto.

RAYMOND MIOLLIS.

REFERENCES CITED

The following references are of record in the file of this patent:

UNITED STATES PATENTS

| Number | Name | Date |
|---|---|---|
| 2,016,612 | Nilsson | Oct. 8, 1935 |
| 2,103,545 | Miollis | Dec. 28, 1937 |
| 2,193,462 | Miollis | Mar. 12, 1940 |
| 2,325,217 | Beers | July 27, 1943 |
| 2,326,133 | Fear | Aug. 10, 1943 |
| 2,366,553 | Petersen | Jan. 2, 1945 |